US008938793B2

(12) United States Patent
Ausems et al.

(10) Patent No.: US 8,938,793 B2
(45) Date of Patent: Jan. 20, 2015

(54) SYSTEM AND METHOD FOR SECURE MANAGEMENT OF TRANSACTIONS (75) Inventors: Michiel Reinier Ausems, Paris (FR); Gerard Jean-Marie Eugene Compain, Paris (FR); Gregoire Mardinian, Montmorency (FR); Jean-Pierre Fortune, Paris (FR); Benedict John Kahan, Le Kremlin Bicetre (FR); Olivier Yves Marie Condemine, Paris (FR)

(73) Assignee: GMX SAS, Paris (FR)

( * ) Notice: Subject to any disclaimer, the term of this patent is extended or adjusted under 35 U.S.C. 154(b) by 812 days.

(21) Appl. No.: 12/680,897

(22) PCT Filed: Oct. 3, 2007

(86) PCT No.: PCT/IB2007/004186
§ 371 (c)(1),
(2), (4) Date: Nov. 10, 2010

(87) PCT Pub. No.: WO2009/044226
PCT Pub. Date: Apr. 9, 2009

(65) Prior Publication Data
US 2011/0047593 A1    Feb. 24, 2011

(51) Int. Cl.
*H04L 29/06*    (2006.01)
*G07F 7/10*    (2006.01)
(Continued)

(52) U.S. Cl.
CPC .............. *G07F 7/10* (2013.01); *G06Q 20/0453* (2013.01); *G07F 7/0886* (2013.01);
(Continued)

(58) Field of Classification Search
None
See application file for complete search history.

(56) References Cited

U.S. PATENT DOCUMENTS 6,163,772 A * 12/2000 Kramer et al. ............... 705/79
6,484,257 B1 * 11/2002 Ellis ............................ 713/153
(Continued)

FOREIGN PATENT DOCUMENTS

CN      1 558 364 A    12/2004
KR   2002 0063345 A     8/2002
WO    2004/057825 A     7/2004

OTHER PUBLICATIONS

GMX SAS; PCT/IB2007/004186 Filed Oct. 3, 2007; International Search Report and Written Opinion; ISA/EP; Jun. 2, 2008; 13pp.
(Continued)

*Primary Examiner* — Jeffery Williams
(74) *Attorney, Agent, or Firm* — Dentons US LLP (57) ABSTRACT Secure management of electronic transactions is provided by a system server that is communicatively coupled to terminals configured as thin client devices (TCD) and to one or more application servers. A TCD completes a secure communications link with the system server, and transfers information concerning the identity of a user and account information from a secure transaction card (STC). Upon authentication, the system server drives the display of available applications at the TCD, allowing the user to select and engage in a desired transaction with the application server hosting the selected application. During the transaction, the system server brokers communications according to the different security schemes used by the TCD and the application server and, ultimately, stores a transaction ticket that memorializes the transaction. The transaction ticket can later be retrieved by presenting appropriate authentication information.

15 Claims, 5 Drawing Sheets (51) Int. Cl.
*G06Q 20/04* (2012.01)
*G07F 7/08* (2006.01)
*G06Q 20/38* (2012.01)
*G06Q 20/20* (2012.01)
*G06Q 20/12* (2012.01)
*G06Q 20/32* (2012.01)
*G06Q 20/34* (2012.01)

(52) U.S. Cl.
CPC ......... *G06Q 20/3827* (2013.01); *G06Q 20/202* (2013.01); *G06Q 20/045* (2013.01); *G06Q 20/12* (2013.01); *G06Q 20/32* (2013.01); *G06Q 20/34* (2013.01)
USPC ................ 726/12; 726/4; 726/14; 713/153

(56) References Cited

U.S. PATENT DOCUMENTS

| | | | | |
|---|---|---|---|---|
| 6,643,701 | B1 * | 11/2003 | Aziz et al. | 709/227 |
| 8,090,654 | B2 * | 1/2012 | Ward et al. | 705/40 |
| 2001/0034663 | A1 * | 10/2001 | Teveler et al. | 705/26 |
| 2002/0069174 | A1 * | 6/2002 | Fox et al. | 705/52 |
| 2002/0073045 | A1 * | 6/2002 | Rubin et al. | 705/65 |
| 2002/0120571 | A1 * | 8/2002 | Maung et al. | 705/42 |
| 2002/0138422 | A1 * | 9/2002 | Natsuno | 705/39 |
| 2002/0152429 | A1 * | 10/2002 | Bergsten et al. | 714/43 |
| 2002/0169984 | A1 * | 11/2002 | Kumar et al. | 713/201 |
| 2004/0139349 | A1 * | 7/2004 | Henn et al. | 713/201 |
| 2005/0192895 | A1 | 9/2005 | Rogers et al. | |
| 2006/0049255 | A1 * | 3/2006 | von Mueller et al. | 235/449 |
| 2006/0049256 | A1 * | 3/2006 | von Mueller et al. | 235/449 |
| 2007/0143227 | A1 * | 6/2007 | Kranzley et al. | 705/67 |

OTHER PUBLICATIONS

European Application No. 07859246.6, Minutes of the Oral Proceedings before the Examination Division, European Patent Office, Dec. 16, 2013; 10 pages.

European Application No. 07859246.6, Memorandum Concerning the Administrative Formalities, European Patent Office, mailed on Jan. 10, 2014; 10 pages.

European Application No. 07859246.6, Communication Under Rule 71(3) EPC, European Patent Office, mailed on Jan. 2, 2014; 43 pages.

* cited by examiner

SYSTEM AND METHOD FOR SECURE MANAGEMENT OF TRANSACTIONS

CROSS REFERENCES TO RELATED APPLICATIONS

The present patent application is a National Stage under 35 USC 365 and claims priority to PCT International Application No. PCT/IB2007/004186 filed Oct. 3, 2007, incorporated herein by reference.

FIELD OF THE INVENTION

The invention relates generally to a system and method for secure management of transactions and more particularly for secure electronic transactions by mobile professionals, merchants and consumers.

BACKGROUND

The annual world wide volume of electronic payments made by consumers exceeds $300 billion and is growing at a rate four times faster than that of the world's gross domestic product. These transactions are enabled by over six billion bank-issued plastic cards ("bank cards") either of the magnetic stripe card or the integrated circuit card ("IC card" or "smart card") type. Although far from immune to risks of fraud and identity theft, the convenience of transactions based on bank cards, and the role of trusted issuers in guaranteeing settlement of such transactions, have gained the cards widespread acceptance from consumers and many merchants.

The security model of transactions based on bank cards has several distinguishing characteristics: (1) card owner authentication is based on one or more of a personal identification number, signature or biometric identification; (2) the critical personal information of the card's owner (e.g., the owner's personal identification number or PIN) is transmitted to the issuing institution via an authorized merchant's terminal, but is not retained by the merchant or any other third party; and, (3) bank cards and bank card readers are compatible with banking industry specifications for security and interoperability, including those maintained by EMVCo LLC and the Payment Card Industry (PCI).

Conventional terminals operable with bank cards for electronic funds transfer at the point of sale ("EFTPOS terminals") tend to be relatively complex, large and heavy. Even "portable" wireless EFTPOS terminals are substantially larger and more expensive than popular modern electronic devices such as cell phones, PDAs and personal MP3 players. This is partly because conventionally designed portable EFTPOS terminals have integral means to produce contemporaneous paper receipts and to provide for long range wireless communications. More importantly, however, conventional EFTPOS terminals have failed to take advantage of the modern interne and wireless communications infrastructure.

The high cost of conventional EFTPOS devices make them unaffordable for many small merchants and service providers. Other mobile professionals, who may find the devices affordable, reject them as unacceptably bulky, heavy or difficult to use. These businesses and professionals and their customers and clients are disadvantaged by the resulting need to transact payments by cash or check.

Moreover, conventional EFTPOS terminals are limited to payment acquisition tasks, and do not support other types of secure transactions that could be advantageously performed using a bank card security model. For example, managing personal financial accounts, or accessing medical, insurance or governmental information, or engaging in on-line gaming and auctions, generally require access at least to a computer terminal or to a proprietary, secure network for adequate security.

Finally, the existing systems within which conventional EFTPOS terminals operate delegate responsibility for compliance with local regulations and standards to the physical terminal. This means that a single terminal is not generally operable in multiple countries.

What is needed is a highly portable, low cost personal terminal that permits secure transactions of many types operable in multiple locales.

SUMMARY OF THE INVENTION

In one embodiment, the present invention provides a system that includes one or more application servers configured for use according to a first security scheme, a thin client device (TCD) configured for use according to a second security scheme, and a system server configured for communications with the application server over a first secure communications link and with the TCD over a second secure communications link, and further configured to broker secure communications between the TCD and the application server by transforming communications made according to the first security scheme into communications employing the second security scheme and vice-versa. The TCD provides an interface for a user, and is operable to receive identity validation information from the user and transmit the identity validation information over the second secure communications link to the system server using the second security scheme. Upon being validated, the TCD is further operable to receive a transaction request from the user and transmit the transaction request to the system server over the second communications link according to the second security scheme.

The system server is operable to receive data from one or more of the application servers over the first communications link and according to the first security scheme, and provide at least some of the data to the TCD over the second communications link and according to the second security scheme. The system server is also operable to, in response to identity validation information received over the second secure communications link from the TCD, permit or deny a transaction request; and, in response to a permitted transaction request, complete a secure communications link between the TCD and the appropriate one of the application servers. Further, the system server is operable to provide secure storage of data related to transactions between the TCD and the application servers.

The system server may receive requests from computer systems other than the application servers and the TCD seeking to retrieve the data related to the transactions between the TCD and the application servers, determine whether the requests are authorized, and if so, provide access to the data related to the transactions (e.g., via email and/or SMS messaging).

The TCD is operable to read an account number from a secure transaction card (STC) and the data related to the transaction is stored such that it is datakeyed to a hash value of the STC account number. The STC may be one of: a magnetic stripe card, a smart card or a card configured to communicate via near field communication.

The identity validation information may be at least one of: a personal identification number, a signature and biometric information; while the second communication link may be one of: a Bluetooth communication link, a Wi-Fi communication link, a WiMax communication link, or a near field communication link, and may further includes one of: a wireless network, a public switched telephone network, or the Internet.

The transaction request may include any of: a funds transfer request, a purchase or sale transaction, a gaming transaction, an auction transaction, or a data exchange with a secure data repository and the TCD may be operable to provide at least some data from the application server by means of a display.

A further embodiment of the invention provides a method that includes identifying, at a system server, an authorized user of a thin client device (TCD) communicatively coupled to the system server via a first communication link, the identification being made according to personally identifying information and account information associated with a secure transaction card (STC); establishing a secure communication channel between the system server and the TCD; displaying at the TCD authorized applications for use, said authorized applications associated with one or more application servers communicatively coupled to the system server via one or more second communication links and said displaying being initiated based on the identification of the user; and facilitating via the system server, a secure transaction between the TCD and a selected one of the applications associated with a respective one of the application servers by brokering the transaction between a first security scheme used between the TCD and the system server and a second security scheme used between the respective application server of the selected one of the applications and the system server.

The system server may store a transaction ticket resulting from the transaction and may grant access to the transaction ticket to a remote computer system requesting same. Such access to the transaction ticket may be granted upon successful presentment of a function (e.g., a hash) of an account number associated with the STC by the remote computer system. The function of the account number may be computed at the remote computer system and the transaction ticket stored using that function of the account number associated with the STC as a datakey.

The TCD may display an advertising message during the transaction and/or an advertising message may be displayed at the remote computer system A further embodiment of the invention provides for brokering transactions between an application server and a thin client device (TCD) at a system server by transforming communications between the TCD and the system server made according to a first security scheme into communications between the system server and the applications server made according to a second security scheme and vice-versa. These and other embodiments of the invention are described further below.

BRIEF DESCRIPTION OF THE DRAWINGS

The present invention is illustrated by way of example and not limitation in the figures of the accompanying drawings, in which:

FIG. 1b is a diagram illustrating a secured data link that is part of the system architecture of FIG. 1a.

DETAILED DESCRIPTION

Described herein are a system and method for enabling secure transactions from a thin client device. In reviewing this description it should be understood that the present invention is not limited in its application to the details of construction and the arrangement of the components described below or illustrated in the drawings. Indeed, the present invention is capable of being implemented in other embodiments and/or of being practiced or carried out in various ways. Stated differently, the present invention is not intended to be limited by the description of any specific examples or use of any particular illustrations, which examples and illustrations are intended only to enhance understanding of the invention. Also, it is to be understood that the phraseology and terminology employed herein is for the purpose of description and should not be regarded as limiting.

The present invention provides a system architecture and method that enables secure transactions to be conducted via a personal terminal having a size, form factor and cost no greater than other common personal electronic devices such as cell phones and PDAs. The personal terminal is configured as a very thin client device (TCD) of a system server. The system architecture and method enables a user of the TCD to securely access a broad range of data (for example, data regarding commercial transactions, medical histories, personal information of the user or others, etc.) and engage in a variety of transactions from the same device. The system architecture and method is compliant with banking industry standards for security and provides for compliance with national and international standards and regulations primarily at the system server so that a single TCD may be operable in multiple locales.

Figure 1A:
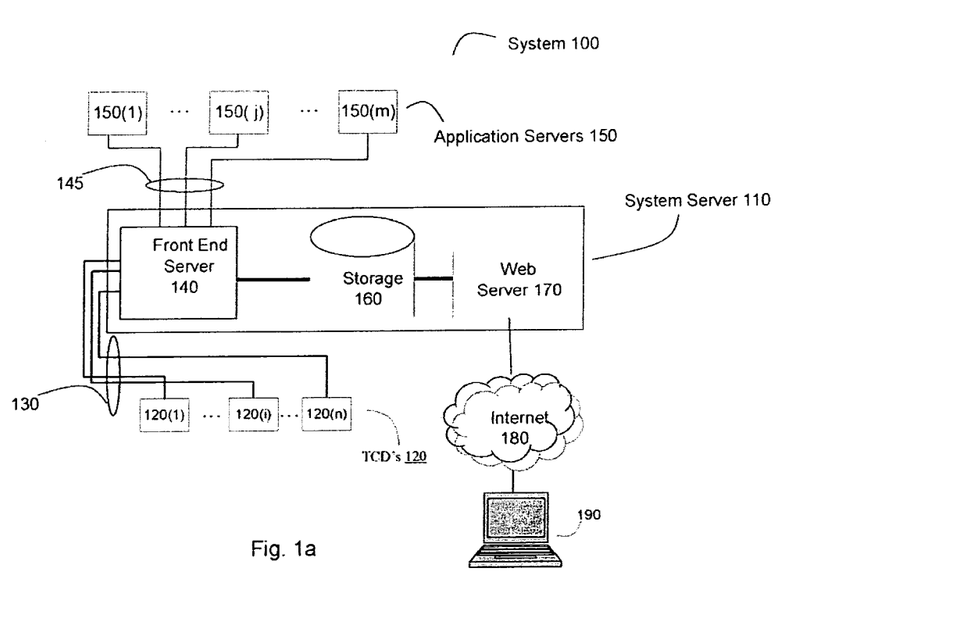
FIG. 1a is a block diagram illustrating the system architecture of one embodiment of the present invention.

FIG. 1a shows a simplified block diagram of a system architecture according to one embodiment of the present invention. As shown in FIG. 1a, system 100 includes a system server 110 that manages the system and is communicatively coupled to a plurality of devices, each configured as a thin client (TCD) 120(i) of the system server.

The system server 110 has a front end server (FES) 140 that is operable to complete secure communications links 130 with the TCDs 120 and secure communications links 145 between the front end server 140 and a plurality of application servers 150. Advantageously, the FES 140 is operable to complete a secure communications link between any of the TCDs 120(i) and any of the application servers 150(j). Further, the FES 140 is operable to permit or deny a request from a user of any of the TCDs 120(i) for connection to a particular application server depending on the nature of the request and the user's identity validation information received over the secure communications link 130 from TCD 120(i).

In some cases, FES 140 may have or receive information sufficient to determine or understand the physical location of the TCD 120(i), and a determination to permit or deny a particular transaction may be responsive to that information (i.e., the type and/or conditions of access may be dependent upon a TCD's physical location). In response to a permitted request to connect to an application server (from an authorized TCD 120(*i*)), the FES 140 is operable to complete a secure communications link between the authorized TCD 120(*i*) and an application server 150(*j*) appropriate to the user's request, selected from among the application servers 150(1)-150(*m*).

The system server 110 also has storage means 160 operable to provide storage (in some cases secure storage) of all data related to any requested transaction. Preferably, all user account data necessary for any transaction is stored only at the appropriate application server 150(*j*) and (to the extent necessary or desired) in storage means 160 within the system server 110, and not, for example, in any TCD 120(*i*).

Each TCD 120(*i*) provides a user interface, including, at a minimum, means to accept inputs from the user, for example, by way of a keypad, pen or touch screen, and to display information to the user such as information related to a transaction. Each TCD 120(*i*) is operable to receive identity validation information, such as a personal identification number (PIN), signature or biometric indicator, from a user and to transmit the identity validation information to FES 140. Each TCD 120(*i*) is operable to complete a secure communications link with the FES 140 and to receive an application request from the user and transmit the application request over the secure communications link to the FES 140. Each TCD 120(*i*) is further operable to read data from an STC, such as a bank-issued smart card or magnetic stripe card, and to transmit the data to an application server 150 (*i*) via the secure communications link 130, the FES 140, and the secure communications link 145. Generally, TCD 120(*i*) is operable with cards compliant with multiple standards, including smart card, magnetic stripe card and near field communication (NFC) standards.

The secured communications link 130 may be implemented directly over the public switched telephone network (PSTN), Internet (or other computer network or network of networks) or wireless communication networks, including such networks as employs the Global Systems for Mobile Communications/General Packet Radio Service (GSM/GPRS) in which case TCD 120(*i*) includes a telephone or modem. However, in one embodiment, secured communications link 130 has several components, as shown in detail in FIG. 1*b*: a local, short range communication link 129, which communicatively couples TCD 120 with communications means 131, and a communications link 132 of arbitrary length, which connects communications means 131 with FES 140.

Figure 1B:
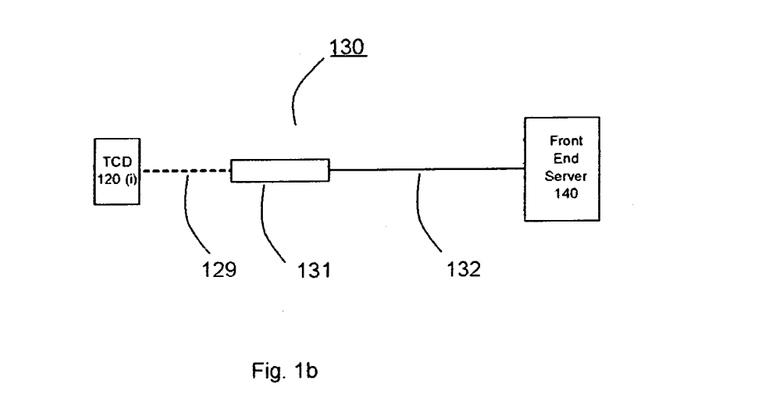

Communication link 129 preferably employs a short range wireless communications protocol such as Bluetooth, Wi-Fi, WiMax, IrDA, wireless universal serial bus (USB) or NFC, but may also or alternatively employ a wired (e.g., Ethernet, USB, Fire Wire, etc.) interface between TCD 120(*i*) and communications means 131. The communications means 131 may be, for example, a mobile phone, a personal digital assistant, a set-top box, or a computer system. Communication means 131, in turn communicates with the FES 140 by way of communications link 132 using any one or more conventional communications infrastructure means such as the PSTN or the Internet. FES 140 and any TCD 120(*i*) are together operative to provide end-to-end security of the secured communications link, preferably through use of techniques compliant with banking industry standards such as those maintained by EMVCo LLC, and the Payment Card Industry.

Application servers 150 may include banking application servers, health care application servers, commercial transaction processing servers, government service provider servers, and/or lottery/gaming servers, but are not limited to same.

The architecture of the present invention is operable to enable a TCD 120(*i*) user to access a variety of other business and personal services with a high degree of privacy and security from a single portable device. For example, the system enables a user of a single TCD 120(*i*) to engage in secured online gaming applications, auction sites, and/or data exchanges with secure data repositories such as those maintained by health care or government service providers as well as to engage in EFTPOS transactions as either a buyer or a seller.

In one embodiment, system server 110 is operable to receive from an application server 150 data related to a transaction, for example a receipt or ticket that documents, for example, the time, date, amount of sale, taxes paid, name of merchant and/or purchaser, method of payment, method of identity validation and other key elements of the transaction. This information may be stored in storage means 160 and may be retrieved after a transaction by an authorized user (e.g., the authorized card holder in the case of a purchase made with a smart card or magnetic stripe card) without necessarily accessing application server 150. Moreover, the same data (or portions thereof) is typically stored in application server 150 and may be accessed by an authorized merchant through system server 110.

In one embodiment, the system server 110 includes a web server 170, which serves as an interface between the system server 110 and users wishing to access the system 100 over the Internet 180 by means of web browser 190, which may execute, for example, on a personal computer, set-top box or PDA. In particular, webserver 170 provides means for a user to securely access and download transaction-related information which the user is authorized to receive, and, for example, to print receipts of transactions. In one embodiment, web server 170 is also operable to send transaction information to a user via e-mail or short message service (SMS) message and/or other means of information delivery.

Figure 2A:
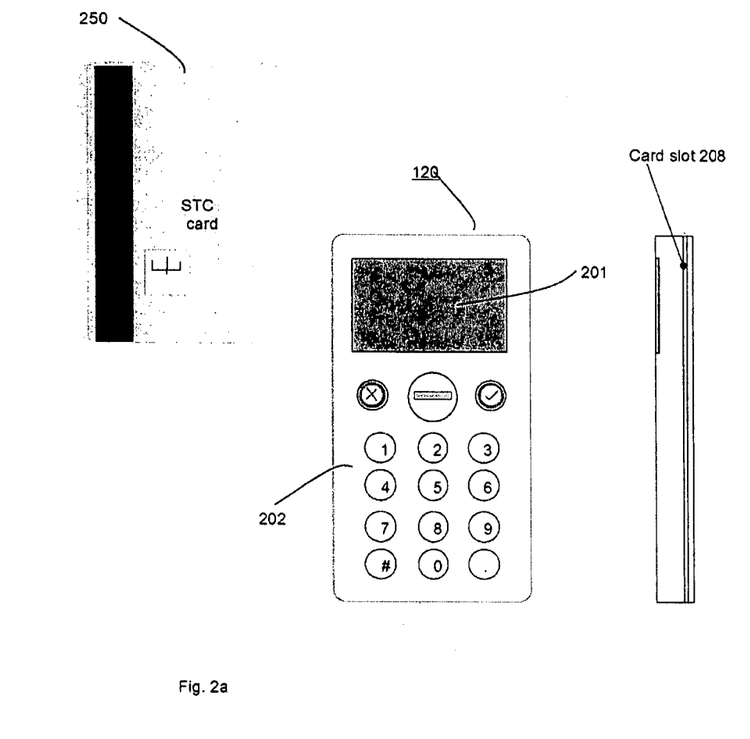
FIG. 2a is an illustration presenting several views of a thin client device for use in accordance with an embodiment of the present invention.

FIG. 2*a* illustrates an exemplary front and side view of TCD 120 together with a conventional STC 250 of either the magnetic stripe or smart card type. The TCD 120 provides a user interface such as a display screen 201 and keypad 202 (which may be combined at least in part as a touch screen, not shown), and a card slot 208 via which read/write operations with STC 250 can be effected. The keypad 202 may be a limited numeric keypad similar to a mobile phone, or provide PDA-like capabilities for alpha-numeric entries.

In one embodiment, the TCD 120 is compatible with both of the currently prevailing conventional card types (magnetic stripe and smart card) as well as the emerging near field communications (NFC) variety of cards. In some embodiments, the TCD provides means for identity validation through entry of a signature or biometric identification such as a fingerprint. The inventors have found that the system architecture and methods of the present invention enable a TCD 120 to have a size and form factor similar to that of an STC 250.

It should be noted that a user interface with a TCD 120(*i*) is also available through communications means 131, which may be, for example, the user's mobile phone, set-top box or PDA, and is communicatively connected to the TCD 120(*i*) via link 129. As described further below, the user interface may be used to display lists of available applications or other services available via different application servers, with the list of applications being delivered to the user interface remotely from the system server and/or the application server(s).

Figure 2B:
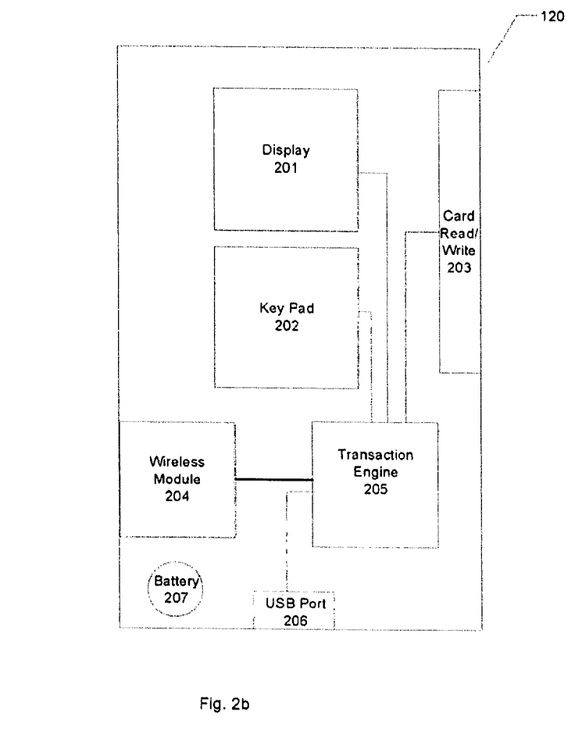
FIG. 2b is a block diagram showing components of the thin client device for use in accordance with an embodiment of the present invention.

FIG. 2*b* presents a block diagram showing functional modules of one embodiment of TCD 120. The TCD preferably has a display screen 201, key pad 202, STC read/write apparatus 203, wireless communication module 204, transaction engine 205, an input/output (I/O) port (e.g., an Ethernet, Fire Wire or USB port) 206, and a power source, such as a rechargeable battery, 207. The wireless communication module 204 is operable to establish at least a short range communication link 129 to communications means 131. Wireless communication module 204 may be compliant with one or more standards for short range communications, including Bluetooth, Wi-Fi, NFC, IrDA, etc. Alternatively, the I/O port 206 permits wired connections to communications means 131. In one embodiment, wireless communication module 204 is operable to connect TCD 120 with a printer equipped with a wireless communication interface. In some embodiments, the TCD 120 may also be equipped with an integral means to access communications networks via the WiMax communication protocol or a communications protocol compatible with a cellular (or other mobile phone) network. The card read/write apparatus 203 is advantageously operable with cards compliant with one or more standards, including smart cards, magnetic stripe cards and near field communication (NFC) cards.

The transaction engine 205 controls operation of the TCD 120, responsive to user inputs, information on the STC 250, and instructions from at least one of the system server 110 and an application server 150(j). In one embodiment, transaction engine 205 is operable to initialize an EFTPOS terminal application in compliance with banking industry standards established by EMVCo LLC. For example, transaction engine 205 is operable to establish a secure channel, using security means such as a secure sockets layer, over a wireless link initially established by wireless module 204. Once a secure channel is established, the transaction engine 205 is controlled by either the system server 110 or an application server 150(j) selected in response to the user's inputs.

Figure 3:
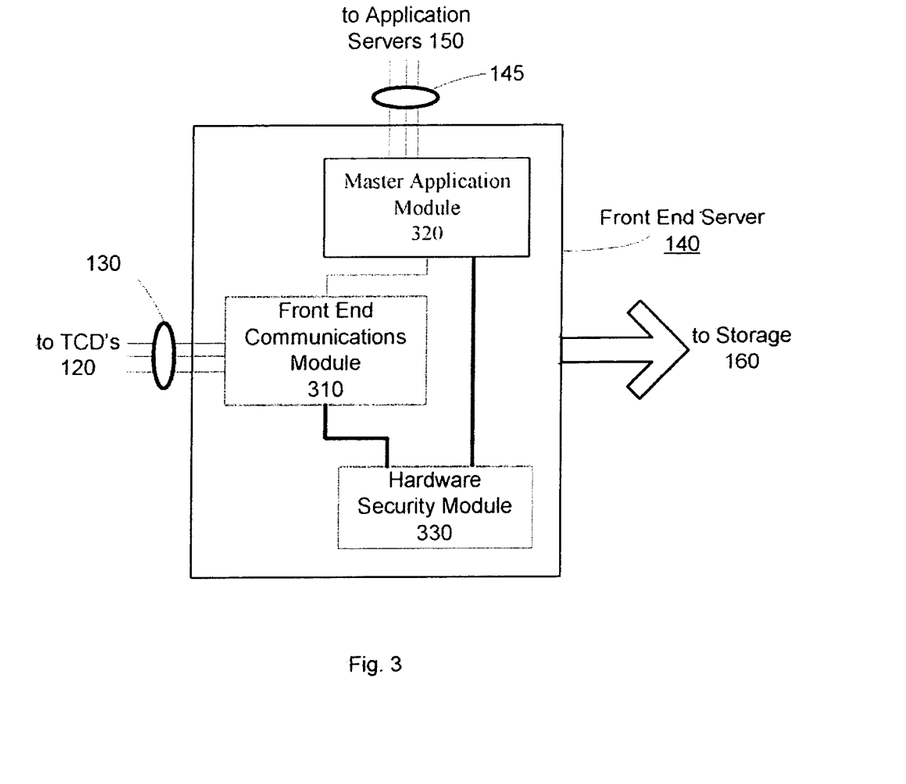
FIG. 3 is a block diagram of a front end server configured for use in accordance with the present invention.

FIG. 3 presents a more detailed block diagram of FES 140 which may have three functional modules: front end communications module 310, master application module 320, and hardware security module (HSM) 330. Front end communications module 310 communicates via secure communications links 130 with the TCDs 120.

Master application module 320 communicates via secure communications links 145 with application servers 150. In addition, master application module 320 provides means to control which specific application server 150(j) a particular TCD 120(i) can access. For example, master application module 320 may access a registry of TCDs 120 and application servers 150 to determine whether access to a particular application server is authorized from a particular TCD 120(i) from a particular physical location. In addition, master application module 320 may control an "idle state" of each TCD 120, the idle state being the user interface state of the TCD 120 before it is connected to a specific application server. For example, the idle state may include display of a "start screen" on which the TCD 120 displays icons representing specific application types (having associated application servers 150, for example) accessible from the TCD 120.

Master application module 320 is operable to enable connections between a TCD 120(i) and an application server 150(j) to which TCD 120(i) is authorized to connect, and to prevent unauthorized connections. It is noted, however, that the fact that a connection is authorized does not imply that any particular transaction will be authorized. Preferably, the capability to authorize any specific transaction resides only in the application server 150(j) (and/or other computer-based resources accessible by the application server).

The HSM 330 manages a secure tunnel between all the various TCDs 120 and the FES 140 using, for example, the secure sockets layer communication protocol. Further, the HSM 330 manages a part of the Payment Card Industry PIN Entry Device security operations when the PIN mode is of the "online" type. For example, a PIN may be transferred from a TCD 120(i) to the HSM 330 through secure communications link 130 and the HSM 330 configured to encrypt the PIN according to a scheme defined by the STC issuer and/or application server operator, taking into account the location of the TCD 120(i). The HSM 330 and the transaction engine 205 of TCD 120(i) are communicatively coupled through a secure tunnel, security means featuring, for example, (1) a unique serial number in each TCD 120(i), (2) a key pair with a public key signed by a certificate authority and stored in each TCD 120(i), and (3) secure sockets layer communication protocol or the like.

Figure 4:
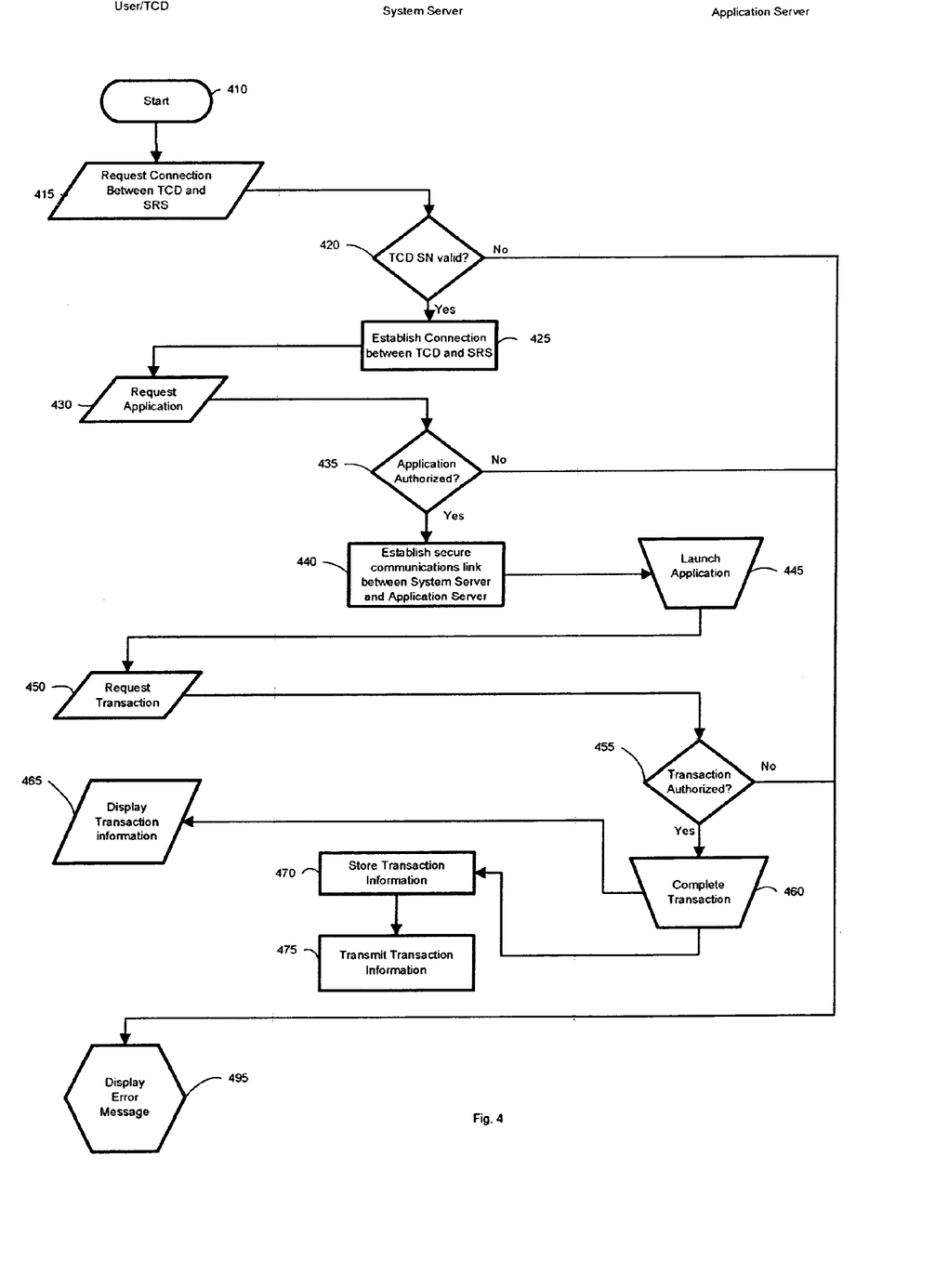
FIG. 4 is a flow chart illustrating a method for enabling a secure transaction according to another embodiment of the present invention.

Reference is now made to FIG. 4, which is a process flow chart illustrating a method of the present invention. In accordance with this method, one or more "users" typically interact with the system 100 by operating a TCD 120, preferably together with a communications means 131. In practicing the method of the present invention, the "user" may be more than one individual during the course of requesting and completing a single transaction: for example, a merchant may provide a TCD 120 for conducting transactions with purchasers who employ their own STC 250 to complete a transaction. For ease of explanation the present discussion assumes such a scenario and refers to "merchants" and "purchasers". It should be understood, however, that this is merely an example of the method. The present invention provides for a variety of other methods, for example, the consumer/purchaser may also be the owner/operator of TCD 120. Furthermore the present invention is beneficial for any type of secure data transaction where user mobility is desirable, not merely transactions between merchants and purchasers.

The merchant initiates the process, step 410, by requesting a connection, step 415, between the merchant's TCD 120 and the system server 110. Advantageously, this step is accomplished with communications means 131 which is communicatively coupled to TCD 120. For example, the merchant may request the connection by selecting a "secured transactions" icon displayed on communications means 131 which advantageously may also be the merchant's mobile phone or PDA, thereby initiating a connection request to system server 110. The connection request will include a serial number or other unique identifier of the TCD 120.

The system server 110 accepts or rejects the connection after checking whether the TCD 120 serial number/identifier is valid. In the event of an invalid serial number (which may result because the TCD 120 was reported lost or stolen or the merchant's account is otherwise suspended) an appropriate error message may be sent to TCD 120 and displayed, step 495, by the TCD 120 or communication means 131.

If the TCD 120 serial number is valid, the system server 110 may establish the requested connection, step 425, by completing a secure communications link 130 between system server 110 and the user's TCD 120. Once a secure communication link has been established, the system server 1110 may provide a list of available applications (and any use restrictions thereon) for display at the TCD. The list may be locally stored at the system server 110, or the system server 100 may poll individual application servers (e.g., using user credentials provided during the authentication process (if any)) to determine which applications are so available via the user's TCD and derive a list from the results of said poll. In any event, the list may be updated from time to time and may depend on a subscription service level associated with the TCD and/or the user thereof (e.g., as identified by one or more of the techniques discussed herein). Note, the security associated with communications link 130 may be, at least in part, physical security, for example where the communication link is solely within a protected network or facility. In other cases, the security associated with communications link 130 may be provided by end-to-end (or node-to-node) encrypted communications or other methods common in the field of computer networks. Such implementation details are not critical to the present invention.

Next, the merchant may request a type of transaction, step 430, preferably by selecting from the menu of available applications (or transactions) displayed on the merchant's TCD 120 or communications means 131. For example, TCD 120 may provide a graphical interface displaying selectable options such as "purchase," "sale," "auction," "gaming," etc. In accordance with an embodiment of the present invention, a single TCD 120(*i*) serves as a gateway for any number of transactions where end-to-end security and privacy is important, such as point-of-sale electronic funds transfers, on-line gaming and lotteries, and document or service requests associated with government services, health care, insurance and the like.

Any single TCD 120(*i*), however, is not generally enabled to access every application server 150(*j*) with which system server 110 is operable. Advantageously, a particular TCD 120(*i*) may only access authorized application servers, i.e., those application servers to which an owner or operator of the TCD 120(*i*) has subscribed or has otherwise opted-in to. Accordingly, at step 435, the system server 110 verifies that the requested application server is authorized. For example, authorization may be granted or denied based on the TCD 120 serial number, and/or based on the personal information and/or physical location of the particular merchant (who need not necessarily be the owner or usual operator of the TCD 120(*i*)). An application may further be authorized or denied based on information contained in a purchaser's STC 250, in which case card 250 should be read by TCD 120(*i*) as part of step 430.

If system server 110 is unable to verify that an access to an application server is authorized, an appropriate error message may be sent to the TCD 120(*i*) and displayed, step 495, by the TCD 120(*i*) or communication means 131. If system server 110 determines that access to the requested application server is authorized, system server 110 will establish, step 440, a secure communications link 145 between system server 110 and the requested application server 150(*j*).

Upon completing secure communications link 145, the TCD 120(*i*) and the application server 150(*j*) are communicatively coupled via FES 140, and the application server 150(*j*) may control the TCD 120(*i*) user interface during the remaining steps. For example, each application server 150 (*j*) may provide a different user interface and command menu appropriate to its function for display on the TCD 120(*i*) or communications means 131. Advantageously, each application server 150(*j*) provides means to ensure security and user privacy appropriate to the requirements of the transaction, the physical location of the TCD 120(*i*), and the nature of the relationship between the merchant and/or purchaser and the application server operator. For example, the purchaser's account number and other identification verification means are preferably stored and controlled by the application server 150, not the system server 110.

At step 445, the application server 150(*j*) launches the requested service to enable the purchaser to request a specific transaction, step 450. To request a transaction, the purchaser will generally first be required to provide identity verification through TCD 120(*i*). This may be accomplished by swiping the purchaser's STC 250 through card slot 208 of TCD 120(*i*), preferably accompanied by entering of the purchaser's PIN. Alternatively, or additionally, the purchaser's identity may be verified through TCD 120 by way of one or more biometric identifiers (e.g., fingerprint, retinal scan or voice recognition), or by a signature.

Application server 150 will determine whether the requested transaction is authorized or not, step 455, based on the purchaser's identity, location and the nature and/or amount of the requested transaction. If the transaction is not authorized, the application server 150 preferably sends an appropriate error message to the TCD 120(*i*) for display, step 495, by the TCD 120(*i*) and/or communication means 131. If the transaction is authorized, then application server 150 completes the transaction 460, and transmits appropriate transaction confirmation information to the TCD 120(*i*) for display, step 465, by the TCD 120 and/or communication means 131.

In one embodiment, the application server 150 also provides summary information regarding the transaction, constituting a "receipt" or "ticket" for storage in system server 110 at step 470. The information in this receipt forms a record of the transaction which is made available for subsequent review and/or downloading by the purchaser and/or merchant as discussed hereinbelow. Preferably, the receipt does not itself contain a purchaser's card or personal identification number, but rather contains, for example, a hash value or other encrypted identifier created from the card number. The hash value of the card number is then used for identification and filing purposes within storage means 160 of system server 110. In one embodiment, the information in the receipt is also sent to the purchaser and/or merchant via, for example, email or SMS at step 475.

Figure 5:
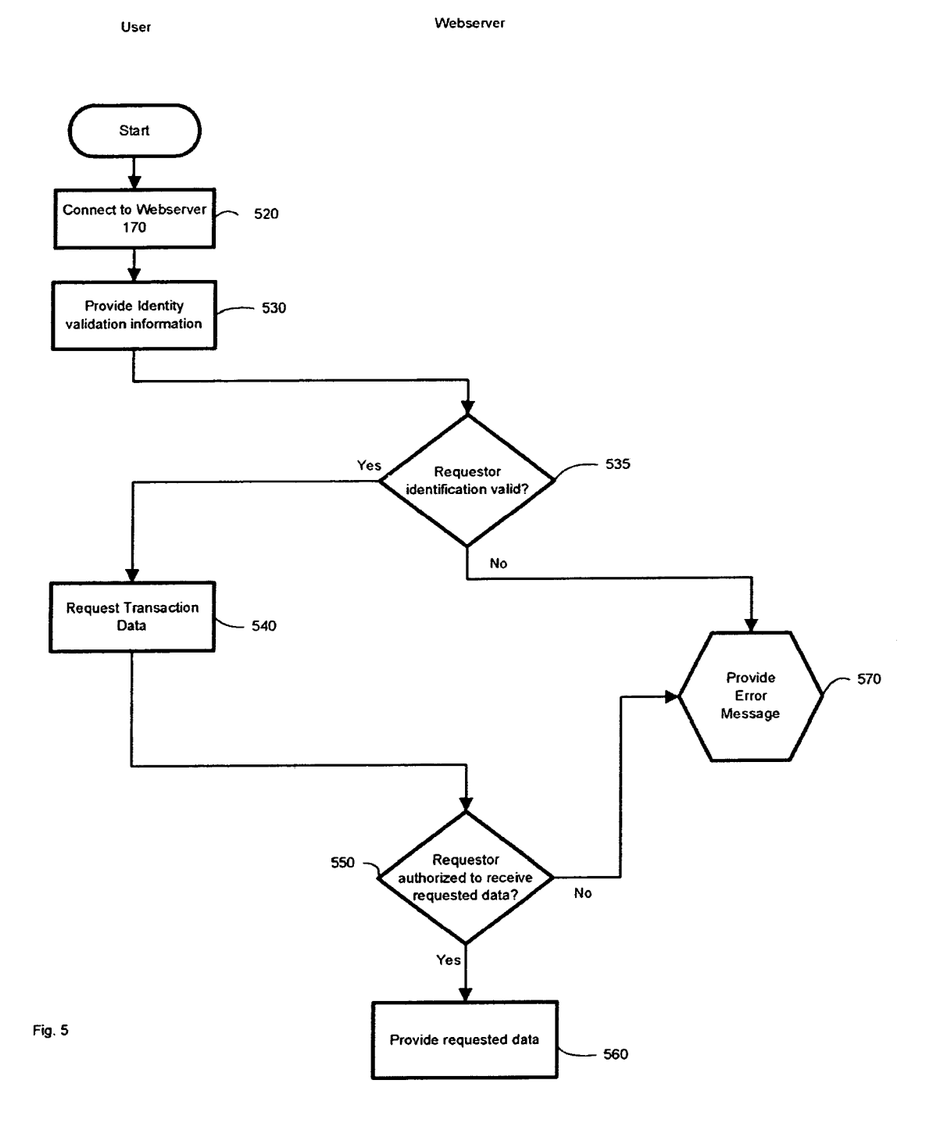
FIG. 5 is a flow chart illustrating a method for providing records related to a secure transaction according to another embodiment of the present invention.

Referring now to FIG. 5, in accordance with one embodiment of the present invention, post-transaction record provisioning is provided as follows. A purchaser or merchant may request documentation of the transaction by accessing webserver 170. The purchaser may connect to webserver 170 at step 520 via any web browser 190 over the internet 180. The webserver 170 will prompt the purchaser to provide identity validation information, step 530. The identity validation information may be a card number and PIN, for example.

If the identity validation information is recognized, the purchaser will be permitted to request transaction data at step 540; otherwise an error message will be provided, step 570. Upon the purchaser's request at step 540, the webserver will determine whether the user is authorized to receive the transaction data requested. If so, transaction data maintained in storage means 160 and associated with the purchaser's card number, (or, preferably, a hash value thereof), is provided, step 560. Otherwise an error message will be provided, step 570. The merchant may access transaction data in manner similar to that just described, but in some cases may also access data, from application server 150(*j*) via system server 110.

From the above, it should be apparent that one of the advantages afforded by the present invention is the ability of the system server (preferably the FES) to act as a security gateway, in effect brokering transactions between a security scheme associated with the TCD and a security scheme associated with the application server(s). Stated differently, the system server may be regarded as an entry point for a number of application servers. As such, it acts as a secure switch to permit selection (in a secure fashion) of an application which will run during a particular transaction. The operation is handled in multiple steps, including: an identification of the particular user of the TCD and mutual authentication of the TCD and the system server with one another; creation of a secure communication channel between the TCD and the system server (e.g., a secure sockets layer tunnel between these devices); facilitation of the display of application alternatives at the TCD (e.g., by providing a list of available applications from the secure server); allowing the user to select the desired application; and, based on that selection, routing of the transaction, in a secure fashion, to the appropriate application server.

The display of application alternatives at the TCD may be facilitated in any of a variety of ways. As indicated above, the list of available applications may be transferred from the system server to the TCD for display (e.g., based on identification and/or authentication of the TCD and/or the user thereof). Alternatively, a preprogrammed list of applications may be stored at the TCD and the system server may indicate which of the applications from that preprogrammed list are tpo be available to a particular user/TCD based on identification and/or authentication of the TCD and/or the user thereof. This is somewhat akin to a software license key unlocking various features of an enterprise or other software application according to the level of subscription purchased.

Alternatively, the system server may use the identification and/or authentication information associated with the TCD and/or the user thereof to poll the various application servers to see which, if any, are to be made available to the TCD/user. In this scenario, the system server itself need not store up-to-date lists or other indicia of available applications. Instead, the server can be assured of reporting the most up to date list of available applications by relying on the servers hosting those applications to determine which applications are to be made available to the user/TCD in question. Of course, some or all of these various methods of facilitating the display of available applications via the TCD may be used in combination with one another, depending on the particular applications involved.

The communications between the TCD and the "secure switch" may be secured by a scheme based on shared secrets (e.g., such as in the SSL communication protocol). Thereafter, however, the particular application selected for a transaction may require use of a separate security model or paradigm. The system server acts as a gateway between the secure tunnel established between the TCD and the systems server and the specific security scheme for the application.

Moreover, as discussed above, the system server may act as a repository for different "proofs of transactions" with various merchants. Thus, a user may aggregate and store a number of different transaction tickets (receipts, invoices, tickets, warranty cards, etc.) received as a result of different transactions and interactions with different applications in one convenient storage location. These stored transaction tickets may be accessible via conventional computer systems that access the system server via webserver 170. Suitable passwords or other security measures may be used to prevent unauthorized access to these transaction tickets.

In some cases, information associated the user's STC may be used to obtain access to the transaction tickets. For example, the first time a user accesses the system server to retrieve a transaction ticket, the user may be prompted to provide his/her STC card number and other personal identification information as a means of authentication and also to retrieve the appropriate ticket. Thereafter, the user may establish an account to which future transaction tickets will be posted and for which the user may register a unique user name/password combination.

In the above scenario, the system server need not necessarily store transaction tickets against a user's STC card number. Instead, a hash or other function of the STC card number may be used and the appropriate transformation (between card number and hash or other function thereof) made when the user enters the STC card number. The transformation may be made at the system server or by an applet, browser plug-in or other routine downloaded to the user's computer. In the latter cases, the STC card number is never transmitted to the system server, thus helping to secure the user's STC card number and/or other personal information.

During any transaction, the system server may send to the TCD one or more advertisements for display. Such advertisements may also be displayed to the user when he/she seeks to retrieve a transaction ticket. This provides means for generating revenue so as to offset the cost of the TCDs, their use and/or the storage costs associated with the transaction tickets, etc. Advertising relevant to the transaction, the transaction ticket, the user profile, etc. may be selected for display.

Thus, a system and method for secure management of electronic transactions has been described. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A system, comprising:
an application server configured for use according to a first security scheme;
a thin client device (TCD) configured for use according to a second security scheme,
a system server configured for communications with the application server over a first secure communications link and with the TCD over a second secure communications link, and further configured to broker secure communications between the TCD and the application server by transforming communications made according to the first security scheme into communications employing the second security scheme and and by transforming communications made according to the second security scheme into communications employing the first security scheme, wherein,
the TCD is further configured to read data from a secure transaction card (STC),
the system server is further configured (i) to provide secure storage of data related to a completed transaction between the TCD and the application server, (ii) to receive a request from a remote computer system, separate from the application server and the TCD, seeking to retrieve the data related to the transaction between the TCD and the application server, (iii) to determine whether the request is authorized, and if the request is authorized, (iv) to provide access to the data related to the completed transaction between the TCD and the application server to the remote computer system,
the data related to the completed transaction between the TCD and the application server is datakeyed at the system server to a hash value of an account number associated with the STC, and
the remote computer system is configured to provide the hash value to the system server in order to obtain access to the data related to the completed transaction between the TCD and the application server.

2. The system of claim 1, wherein the TCD is further configured to receive identity validation information from a user and to transmit the identity validation information over the second secure communications link to the system server using the second security scheme.

3. The system of claim 2, wherein, upon being validated, the TCD is further configured to receive a transaction request from the user and to transmit the transaction request to the system server over the second communications link according to the second security scheme.

4. The system of claim 1, wherein the system server is further configured to receive data from the application server over the first communications link and according to the first security scheme, and to provide at least some of the data to the TCD over the second communications link and according to the second security scheme.

5. The system of claim 1, wherein the system server is further configured to, in response to identity validation information received over the second secure communications link from the TCD, permit or deny a transaction request, and to, in response to a permitted transaction request, complete a secure communications link between the TCD and the application server.

6. The system of claim 1, wherein the system server is further configured to provide the data related to the completed transaction between the TCD and the application server via at least one of email and SMS messaging.

7. The system of claim 1, wherein the TCD includes:
a user interface, and
a transaction engine configured to control an operation of the TCD in response to inputs from a user, information on the STC, and instructions from at least one of the system server and the application server.

8. The system of claim 1, wherein the hash value is based on a hash function of the account number associated with the STC.

9. The system of claim 8, wherein the remote computer system is configured to compute the hash value.

10. The system of claim 1, wherein the STC comprises one of a magnetic stripe card, a smart card and, a card configured to communicate via near field communication.

11. A method, comprising:
identifying, at a system server, an authorized user of a thin client device (TCD) configured to read data from a secure transaction card (STC), the TCD being communicatively coupled to the system server via a first communication link, the identification being made according to personally identifying information and account information associated with the secure transaction card (STC);
establishing a secure communication channel between the system server and the TCD;
based on the identification of the user, displaying at the TCD one or more authorized applications for use at the TCD, the one or more authorized applications being associated with one or more application servers communicatively coupled to the system server via one or more second communication links;
facilitating, via the system server, a secure transaction between the TCD and a selected one of the one or more authorized applications associated with a respective one of the one or more application servers by brokering the transaction between the TCD and the respective application server using a first security scheme between the TCD and the system server and using a second security scheme between the respective application server and the system server; and
once the transaction between the TCD and the respective application server is completed, storing at the system server a transaction ticket resulting from the completed transaction between the TCD and the respective application server, and granting access to the transaction ticket at the system server to a remote computer system, separate from the one or more applications servers and the TCD, requesting the access upon determination that the request is authorized,
wherein,
the transaction ticket stored at the system server is datakeyed to a hash value of an account number associated with the STC, and
the access to the transaction ticket is granted to the remote computer system by the system server upon a successful presentment by the remote computer system of the hash value.

12. The method of claim 11, wherein the TCD includes:
a user interface, and
a transaction engine configured to control an operation of the TCD in response to inputs from the user, information on the STC, and instructions from at least one of the system server and the respective application server.

13. The method of claim 11, wherein the hash value is based on a hash function of the account number associated with the STC.

14. The method of claim 13, wherein the hash value is computed by the remote computer system.

15. The method of claim 11, wherein the STC comprises one of a magnetic stripe card, a smart card, and a card configured to communicate via near field communication.

* * * * *